United States Patent

Reiter et al.

[15] 3,652,940

[45] Mar. 28, 1972

[54] MICROWAVE BALANCED RECEIVER MIXER

[72] Inventors: Gyorgy Reiter; Sandor Szenasi; Bela Toth; Ferenc Rakosi, all of Budapest, Hungary

[73] Assignee: Tavkozlesi Kutato Intezet, Budapest, Hungary

[22] Filed: Feb. 17, 1970

[21] Appl. No.: 12,016

[30] Foreign Application Priority Data

Feb. 27, 1969 Hungary ...............................TA-1007

[52] U.S. Cl. ............................325/446, 329/160, 333/83 R
[51] Int. Cl. .........................................................H04b 1/06
[58] Field of Search.................325/430, 435, 436, 439, 442, 325/445, 446, 448, 449, 450, 451; 329/160–163; 332/43, 47; 333/34, 83 R, 83 A; 331/42, 43; 334/41

[56] References Cited

UNITED STATES PATENTS

| | | | |
|---|---|---|---|
| 3,263,176 | 7/1966 | Riblet | 325/445 |
| 3,513,398 | 5/1970 | Bossard et al | 325/446 |
| 3,196,356 | 7/1965 | Hines | 325/445 |

*Primary Examiner*—Robert L. Griffin
*Assistant Examiner*—Albert J. Mayer
*Attorney*—Young & Thompson

[57] ABSTRACT

The microwave balanced mixer includes two band-pass filters tuned to the frequencies of an input signal and local oscillator signal with means to feed the input and local oscillator signals into a cylindrical cavity resonator as two electromagnetic fields having relative perpendicular polarizations. Means are also provided to couple the cavity resonator to two diode mounts, theses diode coupling means being located on the cylindrical wall of the cavity resonator so that a plane determined by the center of a first of said diode coupling means and the cavity resonator longitudinal axis and a plane determined by the center of a second of said diode coupling means and the cavity resonator longitudinal axis will be perpendicular to each other and to the means for feeding the input and local oscillator signals. The cavity resonator operates in the $TE_{111}$ or $TE_{112}$ modes and includes tuning rods placed in the polarization planes of the two perpendicular modes of the resonator to tune the resonant frequencies to these modes to the frequencies of the input electromagnetic fields. The positions of the polarization planes of the two perpendicular modes of the cavity resonator excited inside the cavity of the resonator by the two electromagnetic fields are chosen so that they will be at angles of substantially 45° to the perpendicular planes of the first and second diode coupling means.

5 Claims, 10 Drawing Figures

MICROWAVE BALANCED RECEIVER MIXER

The subject-matter of the present invention is a microwave mixer circuit coupled to a VHF amplifier, incorporating two mixer diodes which, in addition to the simplicity of its geometrical structure, guarantees a better mixing efficiency than any other of the known designs.

Microwave mixers generate a VHF signal of differential frequency ($f_3 = f_1 - f_2$) from two electromagnetic waves or signals of different frequencies, i.e. from a channel signal of a frequency $f_1$ and a signal of the local oscillator of a frequency $f_2$. In the majority of cases, the channel signal, is a modulated signal and in this case, the generated VHF signal of a frequency $f_3$ will have a modulation corresponding to that of the channel signal. With a microwave mixer, if the frequencies of the channel signal and the local oscillator ($f_1$,$f_2$) are within the microwave range, that of the generated third signal ($f_3$) is within the VHF range. In general the value of the frequency $f_3$ is lower, by an order of magnitude, or two, than the value of the frequency $f_1$ or $f_2$. In microwave mixers, the non-linear properties of the diodes are utilized for frequency transposition (mixing). In microwave mixers employing two diodes, the channel signal and the signal of the local oscillator are each advanced through a filter, i.e. the channel signal filter and the filter of the local oscillator signal, to the mixer diodes. The filters prevent other undesired signals from entering the mixer with the channel signal and the local oscillator signal. In addition to the filters, a microwave circuit element has to be used which splits both the channel signal and the local oscillator signal into two equal parts, and which then advances one part of the signal to the one diode and the other part to the other diode.

Figure 1:
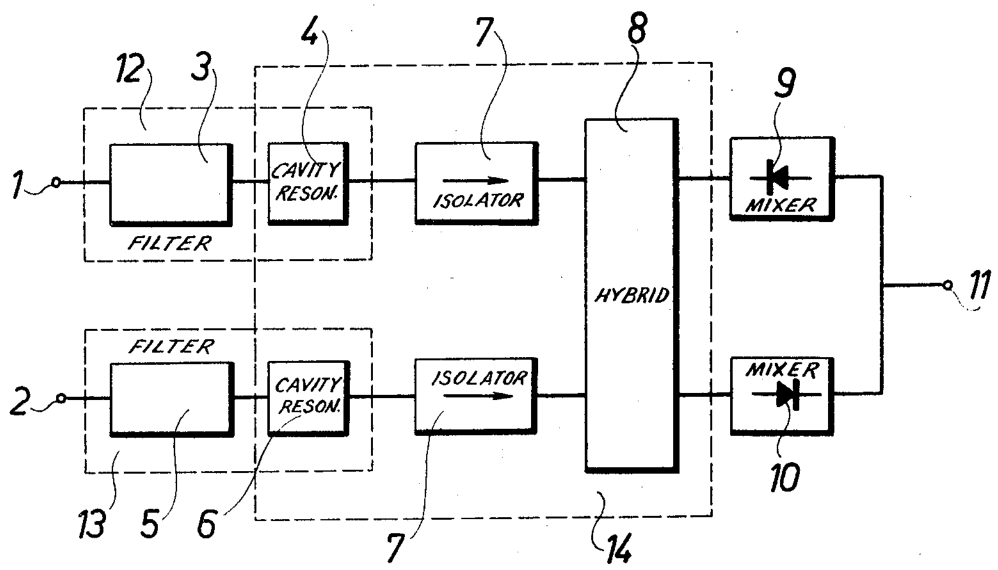
PRIOR ART Fig.1
FIG. 1 illustrates a block diagram of a known microwave mixer circuit.

The schematic layout of the circuit of a known microwave mixer circuit is shown in FIG. 1. The channel signal is coupled through the junction piece 1 to the channel signal filter 12. The microwave isolator 7 connects the filter 12 to the microwave hybrid 8. The local oscillator signal is coupled to the local oscillator signal filter 13 through the junction piece 2. A microwave isolator 7 connects the filter 13 to the hybrid 8. The hybrid 8 divides both the channel signal and the local oscillator signal into two equal parts, and advances the one part to the mixer diode 9, and the other to the mixer diode 10. From the diodes the VHF signal so generated advances through the junction piece 11 to the VHF amplifier.

In response to the channel signal of a frequency $f_1$ and to the local oscillator signal of a frequency $f_2$, owing to the non-linear properties of the diodes, a mirror frequency ($f_4 = 2f_2 - f_1$) will also be generated at the mixer diodes 9, 10. The mirror frequency signal advances from the mixer diodes 9, 10 through the hybrid 8, to the isolators 7, and since its direction of progress runs contrary to the forward direction of the isolators 7, the isolators 7 behave like matched terminations for the mirror frequency signal which will be lost at them in the form of a loss. This loss will be responsible for a deterioration of the efficiency of mixing. The efficiency of mixing may be improved if no isolators 7 are used. In the event of such a design the mirror frequency signal will be reflected at the reactive terminations appearing at the outputs of a cavity resonator 4 and a cavity resonator 6, respectively, of the channel signal filter 12 and the local oscillator signal filter 13, and will then be advanced over the hybrid 8 to the mixer diodes 9, 10. The mirror frequency signal returning to the diodes 9, 10, in conjunction with the local oscillator signal, again generates a VHF signal ($f_5 = f_4 - f_2$). The signal of a frequency $f_5$ and the other of a frequency $f_3$ may differ only in phase from each other. On the other hand, the phase difference depends on the phase delay which the mirror frequency signal undergoes during the process of reflection. On the output junction 11 of the mixer circuit, the signal coupled to the VHF amplifier will be the resultant of the signals of frequencies $f_3$ and $f_5$ defined by the phase relations. The resultant of the signals $f_3$ and $f_5$ will have a maximum when the phases of the two signals are in agreement, and will have a minimum when the phases of the two signals oppose each other. A good mixing efficiency may be achieved when the resultant of the signals $f_3$ and $f_5$ has a maximum. The phase delay of the mirror frequency signal is defined by the electrical distance between the mixer diodes 9, 10 and the cavity resonators 4,6. This distance may be determined by a plurality of considerations. The goal is that this distance should be as short as possible, and yet it should correspond to the correct phase relations. Correct phase relations have to be guaranteed for reasons of good mixing efficiency, whereas the minimum distance is indispensable owing to wideband operation. The phase delay caused by the electrical distance between the mixer diodes 9, 10 and the outputs of the cavity resonators 4,6 varies as a function of the frequency. The change will be greater the longer the distance mentioned above. In general, the channel signal is a modulated signal of a bandwidth corresponding to the modulation. On the output point 11 of the microwave mixer circuit, the resultant of the signals $f_3$ and $f_5$ will appear, and the value of the resultant signal will vary dependent on the difference of the phases of the signals $f_3$ and $f_5$. Consequently a fluctuation of the phase of the signal $f_5$ dependent on the frequency will be responsible for the fluctuation of the amplitude of resultat output signal as a function of the frequency. When isolators 7 are used, no frequency $f_5$ will be generated, the mirror frequency termination being matched, so that on the output point 11 only the VHF signal of a frequency $f_3$ will appear. When isolators 7 are used, a wideband mixer circuit may be obtained, but with a worse mixing efficiency.

From what has been set forth above, it will be evident that wideband operation and a good mixing efficiency require two different designs. The known methods are unable to meet both conditions, since, owing to the use of the hybrid 8 the distance referred to above cannot be reduced to the desired minimum value. In mixer circuits used on long-haul microwave radio connections, both a good mixing efficiency and wideband operation have been made a point. Wideband operation has to be guaranteed for the method of modulation used here, whereas a good mixing efficiency is indispensable for a good noise factor. The method demonstrated in FIG. 1, in addition to its failure to guarantee wideband operation in conjunction with a good mixing efficiency, is far from being simple in design. The use of the isolators 7 and the hybrid 8 results in a geometrical structure of extreme complexity, besides adding costs owing to the insertion of three microwave elements.

The objective of the invention is to provide a method which guarantees wideband operation in conjunction with a good mixing efficiency, and which eliminates the use of isolators 7 and of the hybrid 8, and consequently guarantees a simple and less expensive geometrical design.

Simplicity and low cost of design require the elimination of the isolators and the hybrid from the microwave mixer circuit. In order to achieve a good mixing efficiency, a reactive termination has to be guaranteed for the mirror frequency signal in the circuit adjacent the mixer diodes. The distance between the reactive termination and the mixer diodes must be of minimum value, as this is a condition of wideband operation. Since two diodes are used, facilities have to be provided for the splitting of the channel signal and the local oscillator signal into two equal parts and for the conduction of each part to a diode. The realization of these objectives guarantees the design of wideband microwave mixer circuits of a better mixing efficiency, and of a simpler, less expensive geometrical structure.

The invention consists of a microwave mixer circuit which incorporates two diodes and two filters each connected to a waveguide of rectangular cross-section. These filters constitute a channel signal and a local oscillator signal filter, and to the base-plate of the one filter and to the cover-plate of the other a cylindrical cavity resonator of the mode $TE_{111}$ or $TE_{112}$, calculated by a known method,is coupled over a coupling aperture. This cavity resonator is a structural element of both filters, and the filters are arranged in a way that the wider sidewalls of the waveguides of rectangular cross-section joining the two filters to the cavity resonator are perpendicular to each other. Further, there are two coupling apertures on the mantle of the common cavity resonator, and the arrangement of the coupling apertures on the mantle is such that two planes through the center of gravity of each coupling aperture, partly intersecting each other in the line of the longitudinal axis of the common cavity resonator, are parallel to the wider sidewalls of the joining waveguides of rectangular cross-section and close at an angle of 45°±5° with the planes intersecting each other in the line of the longitudinal axis of the common cavity resonator. A waveguide of rectangular cross-section corporating a diode is coupled to each one of the two coupling apertures arranged on the mantle in a way that the clearance between the coupling plane and the plane of the diode is less than 250 percent of the diameter of the common cavity resonator.

Figure 2:
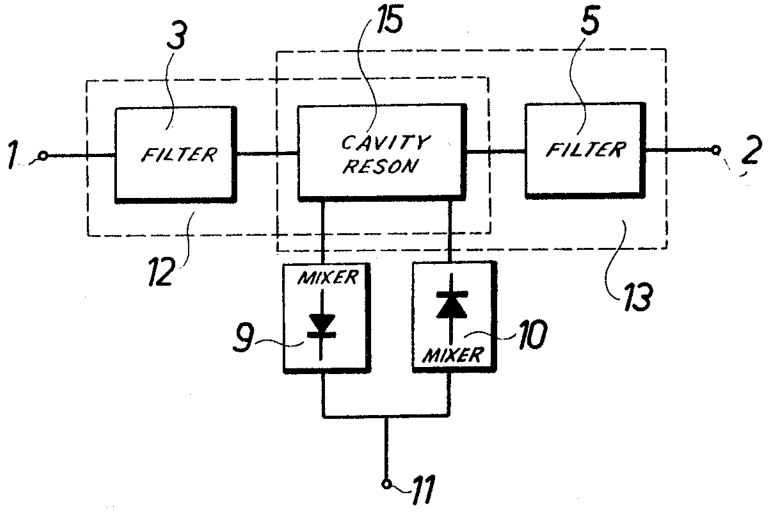
FIG. 2 is a block diagram of the microwave balanced receiver mixer of the present invention.
Figures 3, 4, 5:
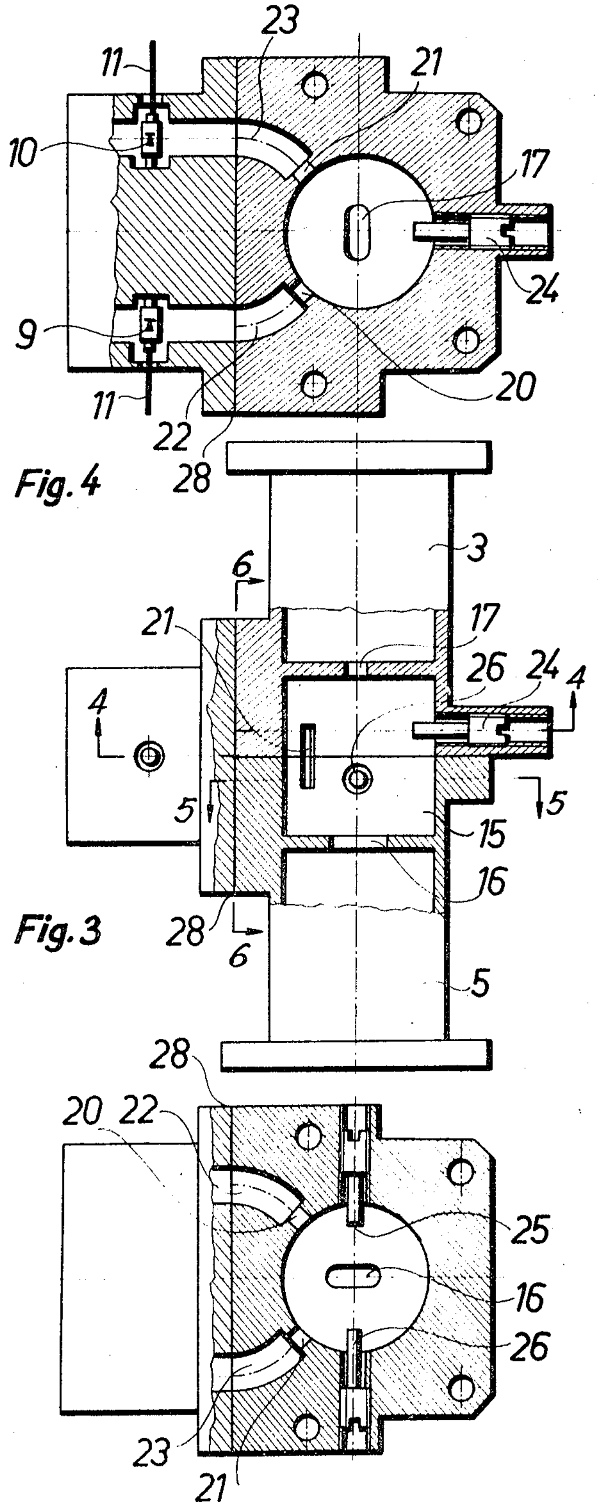
FIG. 3 is a partially sectional view of the microwave balanced receiver mixer of the present invention.
FIG. 4 is a sectional view taken along lines 4—4 of FIG. 3.
FIG. 5 is a sectional view taken along lines 5—5 of FIG. 3.
Figure 6:
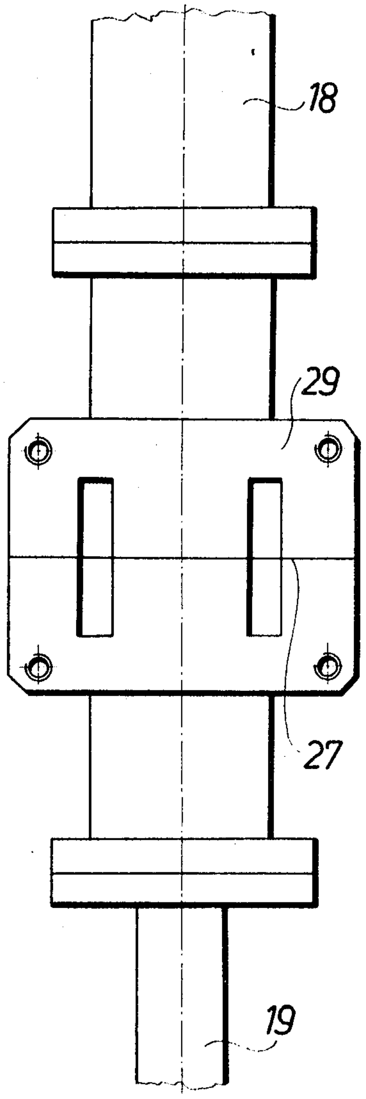
FIG. 6 is a sectional view taken along lines 6—6 of FIG. 3.
Figures 7, 8, 9, 10:
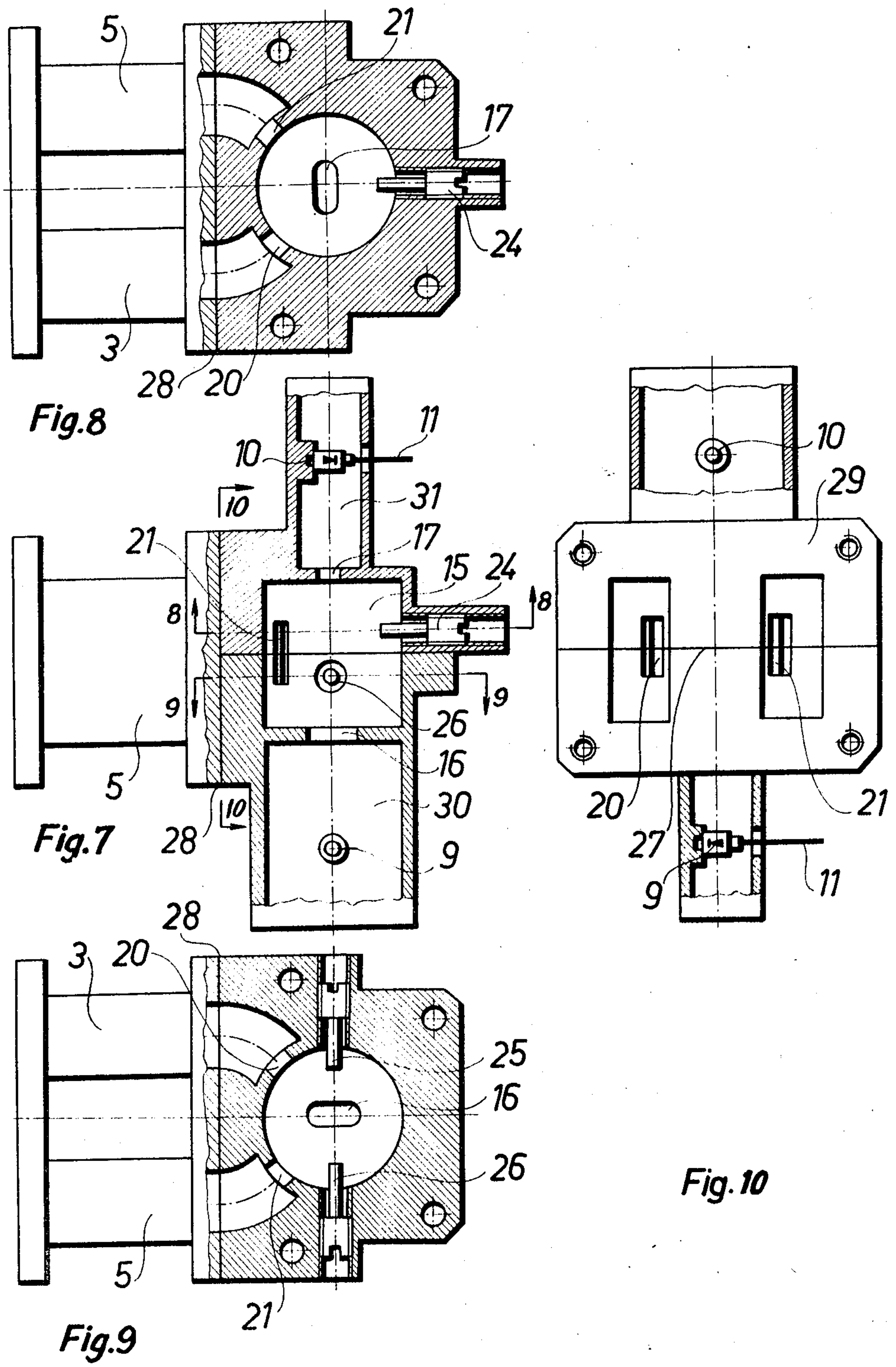
FIG. 7 is a partially sectional view of a second embodiment of the microwave balanced receiver mixer of the present invention.
FIG. 8 is a sectional view taken along lines 8—8 of FIG. 7.
FIG. 9 is a sectional view taken along lines 9—9 of FIG. 7.
FIG. 10 is a sectional view taken along lines 10—10 of FIG. 7.

A schematic layout of the microwave mixer circuit according to the invention is shown in FIG. 2. Instead of the microwave circuit group 14 of the known method shown in FIG. 1. the invention provides a common cavity resonator 15 of new design. The common cavity resonator 15 is a common structural element of the channel signal filter 12 and of the local oscillator signal filter 13. It design it is a cylindrical cavity resonator of circular cross-section of either of the modes $TE_{111}$ or $TE_{112}$. The energization of two polarities permits the performance by the common cavity resonator 15 of the functions of both the cavity resonator 4 of the channel signal filter 12 and the cavity resonator 6 of the local oscillator signal filter 13. There is a coupling aperture on the base-plate and on the cover-plate of the common cavity resonator 15. The cavity resonator group 3 of the channel signal filter 12, and the cavity resonator group 5 of the local oscillator signal filter 13 are coupled to the common cavity resonator 15 through the coupling apertures on the base-plate and on the cover-plate. A waveguide of rectangular cross-section is coupled to the channel signal filter 12 at point 1, and another similar waveguide is coupled to the local oscillator signal filter 13 at point 2. Each waveguide of rectangular cross-section is coupled so that the wider sidewalls of the waveguides are perpendicular to each other. With this arrangement of the waveguides of rectangular cross-section in the common cavity resonator 15, the planes of the two polarizations perpendicular to each other come into being in a way that the one polarization plane will be parallel to the narrower sidewalls of the waveguide of rectangular cross-section coupled to point 1, whereas the other polarization plane will be parallel to the narrower sidewalls of the waveguide of rectangular cross-section coupled to point 2. In a microwave mixer circuit, the frequency $f_1$ of the channel signal and the frequency $f_2$ of the local oscillator signal depend on the circumstances of utilization. The conditions of utilization also define the value of the frequency $f_3=f_1-f_2$. Owing to the difference between the frequencies $f_1$ and $f_2$, the resonance frequency of the common cavity resonator 15 has to be set to a polarization corresponding to both the channel signal of a frequency of $f_1$ and the local oscillator signal of a frequency $f_2$. The resonance frequency of a cavity resonator is determined by the geometrical dimensions thereof. However, for given geometrical dimensions, the resonance frequency may be varied by means of a tuning plunger rod appropriately placed,made of either a metal of a dielectric. In the common cavity resonator, a single tuning plunger rod, or two may be applied to both polarizations, and by means of these tuning plungers rods the resonance frequency of the common cavity resonator 15 may be set to the channel signal polarization of a frequency $f_1$ and to the local oscillator signal polarization of a frequency $f_2$.

In addition to being a common structural element of both the channel signal filter 12 and the local oscillator filter 13, the common cavity resonator 15 also performs the functions of the hybrid 8. This has been achieved by two coupling apertures that have been formed on the mantle which establish connection to the mixer diodes 9, 10. The coupling apertures have been formed on the mantle in a way that two planes through the center of each a coupling aperture intersecting each other in the line of the longitudinal axis of the common cavity resonator 15 and parallel to the wider sidewalls of the waveguides of rectangular cross-section coupled to the points 1 and 2, and cross at an angle of 45°±5° with the planes intersecting in the line of the longitudinal axis of the common cavity resonator 15. With this arrangement of the coupling apertures the channel signal and the local oscillator signal generated in the common cavity resonator 15 in the manner defined earlier will be split into two equal parts. One of the parts is led to the mixer diode 9, while the other is directed to the mixer diode 10 over the waveguides of rectangular cross-section coupled to the coupling apertures. Tests have been carried out in order to determine the length of the waveguide sections of rectangular cross-section interconnecting the coupling apertures and the diodes 9, 10. As a result of these tests, for reasons of wideband operation, the length of the waveguides should be less than 250 percent. of the diameter of the common cavity resonator 15. As a matter of fact, in the solution according to the invention, a reactive termination is applied to the mirror frequency. The termination is formed in the plane of the coupling apertures arranged on the mantle of the common cavity resonator 15. For the purpose of wideband operation and owing to reasons given in detail earlier, preferably a minimum value should be chosen for the waveguide section between the mixer diodes 9, 10 and the terminations. A length lower than 250 percent. of the diameter may still be regarded as minimum. Earlier it has been mentioned that preferably tuning plungers rods tuning to both polarizations should be used in the common cavity resonator 15. For the arrangement of the tuning plungers rods, tests have indicated that a tuning plunger rod should be assigned to the polarization whose plane is through the center of each coupling aperture arranged on the mantle of the common cavity resonator 15 and halves the angle closed by the two planes intersecting each other in the line of the longitudinal axis of the common cavity resonator 15. The longitudinal axis of the tuning plunger rod is fitted to the halving plane and is perpendicular to the longitudinal axis of the common cavity resonator 15. Two tuning plungers rods should be assigned to the polarization perpendicular to the halving plane mentioned before, the longitudinal axis of such tuning plunger rods lying in a straight line and perpendicular to the halving plane and to the longitudinal axis of the common cavity resonator 15. Two tuning plungers rods have to be used in order that tuning might be symmetrical in this plane. As a matter of fact, asymmetric tuning does not permit the splitting of the channel signal and the local oscillator signal into two equal parts, and consequently at the mixer diodes 9, 10 the amplitudes of both the channel signal and the local oscillator signal will differ from each other. This is not permissible for microwave mixer circuits as it may be responsible for the deterioration of the noise factor.

The invention includes a second embodiment where the cavity resonator group 3 of the channel signal filter 12 and the cavity resonator group 5 of the local oscillator signal filter 13 are coupled to the coupling apertures formed on the mantle, and not to those arranged on the base-plate and cover-plate of the common cavity resonator 15. The mixer diodes 9, 10 are each coupled through a waveguide section of rectangular cross-section to the coupling apertures shaped on the base-plate and coverplate and not on the mantle. From the electrical point of view the two embodiments are equivalent.

The microwave mixer circuit according to the invention operates also as a sum frequency mixer. In this case the circuit generates the modulated microwave channel signal of a frequency $f_1$ from a modulated VHF signal of a frequency $f_3$ and a microwave local oscillator signal of a frequency of $f_2$.

The most important characteristic of equipment operated on long-haul radio telephone connections is the maximum distance which may be covered by the equipment. This distance is a function of the signal-to-noise ratio. For a good signal-to-noise ratio, a good mixing efficiency has to be guaranteed in the mixer circuits incorporated in the equipment. The equipment here referred to is used for the transmission of multi-channel telephone connections, television or digital signals over long distances. Owing to this use of the equipment, the modulated signals are of a large bandwidth, and therefore the circuits used in these systems have to guarantee wideband operation.

The microwave mixer circuit of the invention realizes a good mixing efficiency in conjunction with wideband operation, and by this method provides a better circuit than any other earlier method. Another advantage as compared to the earlier systems is the appreciably simpler design. It is due to the simplicity of the system according to the invention that its construction requires far lower costs and that for its geometrical dimensions, the microwave mixer circuit is considerably smaller. In equipment used on long-haul microwave radio connections a microwave mixer circuit having these properties is indispensable.

An example representing the first embodiment of the system according to the invention is shown in FIGS. 3–6. To the common cavity resonator 15 through the coupling aperture 16 the cavity resonator groups 5 of the local oscillator signal filter 13 are coupled. Through the coupling aperture 17 the cavity resonator groups 3 of the channel signal filter 12 are coupled. The channel signal filter 12 is connected to the waveguide 18 of rectangular cross-section, the local oscillator signal filter 13 is connected to the waveguide 19 of rectangular cross-section. The wider sidewalls of the waveguides 18 and 19 of rectangular cross-section are perpendicular to each other. On the mantle of the common cavity resonator 15 the coupling apertures 20, 21 are arranged. The waveguides 22, 23 of rectangular cross-section connect the coupling apertures 20, 21 and the mixer diodes 9, 10. The resonance frequency of the common cavity resonator 15 is set for the channel signal by means of the tuning plunger rod 24, and for the local oscillator signal by means of the tuning plungers rods 25, 26. The common cavity resonator 15 is split into two parts by the plane 27 perpendicular to its longitudinal axis. The plane 28 splits the waveguides 22, 23 of rectangular cross-section into two parts, viz. a section which in longitudinal section is of sector shape, and a section which in longitudinal section is of prism shape. The longitudinal sector shaped and the longitudinal prism shaped sections are interconnected by the junction piece 29. The mixer diodes 9, 10 join the VHF amplifier at the points 11.

An example of the second embodiment of the system according to the invention is shown in FIGS. 7–10. The mixer diodes 9 and 10 are connected to cavity resonator 15, over the coupling apertures 16, 17 and the waveguides 30, 31 of rectangular cross-section. The wider sidewalls of the waveguides 30, 31 are perpendicular to each other. Connected to the coupling aperture 20 arranged on the mantle of the common cavity resonator is the cavity resonator group 3 of the channel signal filter 12, while the coupling aperture 21 is connected to the cavity resonator group 5 of the local oscillator signal filter 13. The cavity resonator groups 3 and 5 of the channel signal filter 12 and the local oscillator signal filter 13 are split by the plane 28 into two sections. The cavity resonators in a section in the direction of the coupling apertures 20, 21 are sector shaped in longitudinal section while the other cavity resonators are in their longitudinal section prism shaped. The resonance of the common cavity resonator 15 may be set to the one polarization by means of the tuning plunger rod 29, and to the other polarization by means of the tuning plungers rods 25, 26. The common cavity resonator 15 is split by the plane 27 into two sections. The junction piece 29 connects the two sections split by plane 28. The mixer diodes 9, 10 join the VHF amplifier at points 11.

What we claim is:

1. A microwave balanced receiver mixer for mixing first and second input signals comprising a first band-pass filter tuned to the frequency of the first input signal for receiving said first input signal, a second band-pass filter tuned to the frequency of the second input signal for receiving said second input signal, a single cylindrical cavity resonator means of circular cross section operable in two perpendicular modes, first and second coupling means connected respectively to said first and second band-pass filters and to said cavity resonator means, said first and second coupling means operating to feed said first and second input signals into said cavity resonator means as two electromagnetic fields of relatively perpendicular polarization, first and second mixer diode means, first and second diode wave coupling means coupling said diode mixer means to said cavity resonator means, said first and second diode wave coupling means being arranged so that a plane determined by the center of said first diode wave coupling means and the longitudinal axis of the cavity resonator means and a plane determined by the center of said second diode wave coupling means and the longitudinal axis of the cavity resonator means are relatively perpendicular and perpendicular to said first and second coupling means and tuning means in the polarization planes of the two perpendicular modes of the cavity resonator means for tuning the respective resonant frequencies of these modes to the frequencies of said two perpendicularly polarized electromagnetic fields, the positions of the perpendicular polarized planes of the two modes excited within said cavity resonator means by said two electromagnetic fields being at angles of substantially 45° to the two perpendicular planes determined by the first and second diode wave coupling means and the longitudinal axis of the cavity resonator means.

2. The microwave balanced receiver mixer of claim 1 wherein the clearance between the plane of said first and second mixer diode means and the coupling plane of said first and second diode wave coupling means with said cavity resonator means is less than 250 percent of the diameter of said cavity resonator means.

3. The microwave balanced receiver mixer of claim 1 wherein said planes determined by the first and second diode wave coupling means intersect at the longitudinal axis of said cavity resonator means, said tuning means including a first tuning rod having a longitudinal axis which bisects the angle formed by said intersecting planes and extends perpendicular to the longitudinal axis of said cavity resonator means and second and third tuning rods arranged in opposed relationship with the longitudinal axes thereof being in a straight line perpendicular to the longitudinal axes of said first tuning rod and cavity resonator means.

4. The microwave balanced receiver mixer of claim 1 wherein said first and second diode wave coupling means include coupling apertures formed in opposed ends of said cavity resonator and waveguides of rectangular cross section extending between said coupling apertures and said first and second mixer diode means, said waveguides being relatively arranged so that the wider sidewalls thereof are perpendicular, and said first and second coupling means including coupling apertures formed in the side of said cavity resonator and waveguides extending between said coupling apertures and said first and second band-pass filters.

5. The microwave balanced receiver mixer of claim 1 wherein said first and second coupling means include coupling apertures formed in opposed ends of said cavity resonator and waveguides of rectangular cross section extending between said coupling apertures and said first and second band-pass filters, said waveguides being relatively arranged so that the wider sidewalls thereof are perpendicular, and said first and second diode wave coupling means including coupling apertures formed in the side of said cavity resonator means and waveguides extending between said coupling apertures and said first and second mixer diode means.

* * * * *